United States Patent
McMenamin et al.

(10) Patent No.: US 9,575,911 B2
(45) Date of Patent: Feb. 21, 2017

(54) INTERRUPT CONTROLLER AND A METHOD OF CONTROLLING PROCESSING OF INTERRUPT REQUESTS BY A PLURALITY OF PROCESSING UNITS

(71) Applicants: David McMenamin, Glasgow (GB); James Andrew Collier Scobie, Helensburgh (GB)

(72) Inventors: David McMenamin, Glasgow (GB); James Andrew Collier Scobie, Helensburgh (GB)

(73) Assignee: NXP USA, INC., Austin, TX (US)

( * ) Notice: Subject to any disclaimer, the term of this patent is extended or adjusted under 35 U.S.C. 154(b) by 488 days.

(21) Appl. No.: 14/246,832

(22) Filed: Apr. 7, 2014

(65) Prior Publication Data

US 2015/0286595 A1    Oct. 8, 2015

(51) Int. Cl.
*G06F 11/00*    (2006.01)
*G06F 13/26*    (2006.01)
*G06F 11/20*    (2006.01)

(52) U.S. Cl.
CPC ........... *G06F 13/26* (2013.01); *G06F 11/2069* (2013.01); *G06F 11/2092* (2013.01); *G06F 11/2094* (2013.01); *G06F 11/2089* (2013.01); *G06F 2201/805* (2013.01)

(58) Field of Classification Search
CPC .............. G06F 11/2092; G06F 11/2094; G06F 11/2069; G06F 11/2089; G06F 11/1446; G06F 11/201; G06F 2201/805

See application file for complete search history.

(56) References Cited

U.S. PATENT DOCUMENTS

| 7,962,771 | B2 | 6/2011 | Song et al. | |
|---|---|---|---|---|
| 2011/0145461 | A1 | 6/2011 | Zhao et al. | |
| 2012/0036391 | A1* | 2/2012 | Li | H04L 45/00 714/4.11 |
| 2012/0089761 | A1 | 4/2012 | Ryu et al. | |
| 2012/0159234 | A1* | 6/2012 | Mehta | H04L 41/0663 714/4.11 |

OTHER PUBLICATIONS

Gountanis, R.J. et al., "A Method of Processor Selection for Interrupt Handling in a Multiprocessor System," Gountainis and VISS: Processor Selection for Interrupt Handling, Proceedings of the IEEE, vol. 54, issue 12; Dec. 1966; pp. 1812-1819.

* cited by examiner

*Primary Examiner* — Ernest Unelus (57) ABSTRACT

An interrupt controller for controlling processing of interrupt requests by a plurality of processing units. The processing units have at least two modes: an active mode and an inactive mode. The interrupt controller comprises a controller input, an interrupt router coupled to the controller input and a monitoring unit. The monitoring unit outputs a routing change signal to the interrupt router if it determines that a selected processing unit, to which, in response to a received interrupt request, an execution of an interrupt service routine was initially routed, is in inactive mode while a preselected one is in the active mode. The interrupt router reroutes the execution of the interrupt service routine to the preselected processing unit.

18 Claims, 4 Drawing Sheets

INTERRUPT CONTROLLER AND A METHOD OF CONTROLLING PROCESSING OF INTERRUPT REQUESTS BY A PLURALITY OF PROCESSING UNITS

FIELD OF THE INVENTION

This invention relates to an interrupt controller and to a method of controlling processing of interrupt requests by a plurality of processing units. The invention further relates to a microprocessor that includes said interrupt controller, to an automotive vehicle that includes any of said interrupt controller or microprocessor and to a computer readable medium.

BACKGROUND OF THE INVENTION

When in operation, CPUs of microprocessors, such as general purpose microprocessors, microcontrollers, digital signal processors or other types of microprocessors, perform a certain task, such as the execution of a series of instructions defined by, for example, a computer program. Other devices or computer programs can have the CPU perform requested services by generating interrupt requests. An interrupt request may for example be transmitted by a peripheral device of the microprocessor to the CPU. The interrupt request may for example be sent by an external memory device (external to the microprocessor), such as a hard-disk, to signal the completion of task, such as a data transfer from or to the peripheral. Also, the interrupt request may for example be used to transmit information to the CPU. For instance, a system timer may periodically transmit interrupt requests which can be used by the CPU to establish a time-base.

The interrupt requests are propagated to an interrupt controller via multiple interrupt request lines. Once the interrupt controller identifies an active interrupt request line, it may grant the interrupt request and forward the interrupt request to the CPU. In response to the interrupt request, the CPU will interrupt the task being performed and perform a sequence of steps, generally referred to as an interrupt handler or interrupt service routine, associated with the requested interrupt. After handling the interrupt, the CPU returns (in normal operations) to the previous interrupted task.

However, in case a CPU becomes unavailable, the handling of the interrupts and of the processing tasks associated to the corresponding interrupts cannot be guaranteed anymore. For example, in applications where safety may be valued, such as automotive applications, there is a need to provide fail safe or fail-operational systems. In typical microcontroller or microprocessor units used in such applications, a CPU of the microcontroller or microprocessor unit is shut down or halted when the CPU becomes unavailable (e.g. to reduce power consumption in the microcontroller or when a fault is detected in the CPU of the microprocessor). When the CPU is shut down or halted, the tasks handled by the processing unit are suspended, together with the processing tasks associated with the interrupts handling.

Gountanis, R. J.; Viss, N. L., "A method of processor selection for Interrupt handling in a multiprocessor system" Proceeding of the IEEE, vol. 54, no. 12, pp. 1812-1819, December 1966 discloses a method of assigning external interrupts to CPUs in a multiprocessor system. A hardware component called Interrupt Directory selects a most appropriate CPU in the multiprocessor system according to an Interrupt Priority (IP) number associated with each possible external interrupt condition and an Interruptibility Index (II) assigned to each task in every CPU of the multiprocessor system. If the Interrupt priority is greater than the Interruptibility Index, then the external interrupt is routed to a CPU executing a task with the corresponding Interruptibility Index.

A disadvantage of the disclosed multiprocessor system described in this document is that only the processing tasks signalled with interrupts with high priority are assigned in the multi-processor system based on a comparison between the Interrupt Priority (IP) and the Interruptibility Index (II). Furthermore, although the disclosed multiprocessor system redistributes the load between the CPUs in the multiprocessor systems, it lacks safety functionality, as desirable in for example, in fail-operational systems.

SUMMARY OF THE INVENTION

The present invention provides an interrupt controller, a method of controlling processing of interrupt requests, a microprocessor, an automotive vehicle and a non-transitory computer readable medium as described in the appended claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

Figure 1:
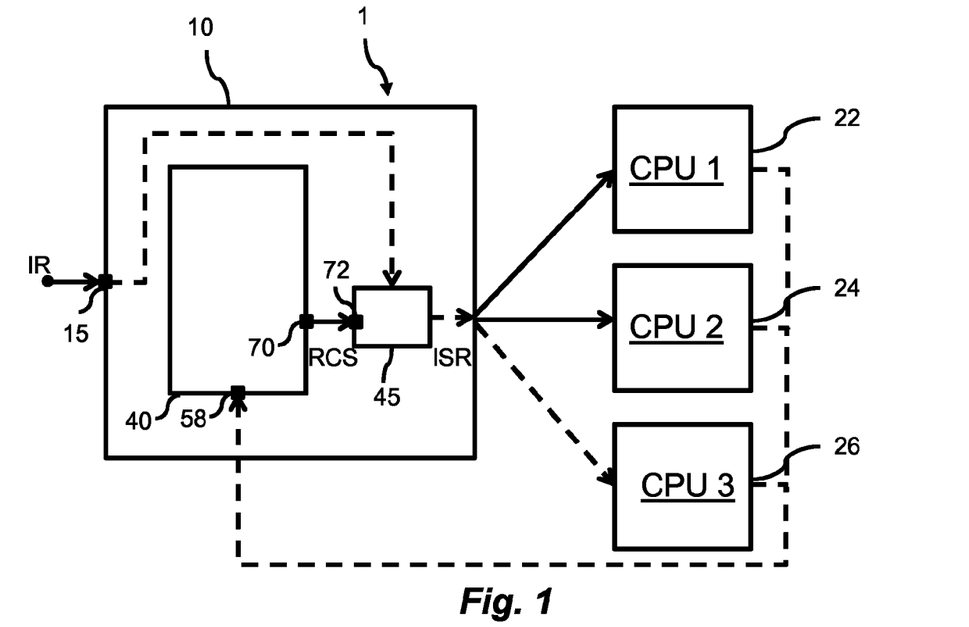
FIG. 1 schematically shows a block diagram of a first example of a microprocessor.

FIG. 1 schematically shows a block diagram of a first example of a microprocessor 1. The microprocessor 1 includes a plurality of central processing units or processing cores 22, 24 and 26 and an interrupt controller 10. The microprocessor 1 may be any suitable type of microprocessor, such as a general purpose microprocessor, a microcontroller, a digital signal processor, etc. The microprocessor may for example comprise one, two or more central processing units (CPU) or cores. Additionally, the microprocessor may comprise one or more peripherals, such as hardware accelerators, I/O ports, co-processors or otherwise, and/or memory, such as volatile or non-volatile memory, for example on-chip flash or RAM. The microprocessor 1 may be provided as a single die or multiple dies in an integrated circuit package. The microprocessor 1 may e.g. be a microcontroller in a multiprocessor system, used in a safety critical application or in any other suitable application.

The microprocessor 1 may be for example used in automotive vehicles and may contain hardware features that allow the microprocessor 1 to achieve high safety integrity levels and reliability. These hardware features may include redundant logic circuit, internal self-test functionality, fault control handling and redundancy checkers. The interrupt controller 10 is one of the hardware features that can make the microprocessor more secure.

In FIG. 1, three processing units 22, 24 and 26 are shown. The microprocessor 1 may include two, three or more processing units. Each of the processing units 22, 24 or 26 of the plurality is arranged to handle interrupt-based tasks (i.e. an interrupt handler) associated with each processing unit 22, 24 or 26. For example, a fixed and/or configurable initial association can be established between each type of interrupt request to be handled and an associated one of the plurality of processing units 22, 24 or 26 so that when an interrupt request is received, an associated processing unit services the request by executing the interrupt handler belonging to that type of interrupt request. Thereby the load of the associated interrupts based task among the processing units 22, 24 and 26 can be known a priori.

The interrupt controller 10 controls processing of interrupt requests at the plurality of processing units 22, 24 and 26. The processing units 22, 24 and 26 have at least two modes, an active mode and an inactive mode. The interrupt controller 10 comprises a controller input 15 receiving an interrupt request IR and an interrupt router 45 coupled to the controller input 15. The interrupt router 45 is arranged to initially route the received interrupt request IR to a selected processing unit 26 out of the plurality of processing units 22, 24 and 26, e.g. to one of the processing units that have been associated with the respective type of interrupt request. In response to the received interrupt request IR the selected processing unit 26 executes an interrupt service routine ISR or an interrupt handler associated with the received interrupt request IR.

The interrupt controller 10 further comprises a monitoring unit 40 which includes a monitoring input 58 connectable to the plurality of the processing units 22, 24 and 26, and a monitoring output 70 connected to a router input 72. The monitoring output 70 outputs a routing change signal RCS to the router input 72 if the monitoring unit 40 determines that the selected processing unit 26 is in inactive mode while a preselected processing unit, e.g. the processing unit 22 or the processing unit 24, is in the active mode.

The interrupt router 45 is further arranged to reroute the execution of the requested interrupt driven task from the selected processing unit 26 to the preselected processing unit 22 or 24 when in use the selected processing unit 26 becomes inactive while the preselected processing unit 22 or 24 is in an active mode. The selected processing unit 26 may e.g. become inactive because of a software or hardware failure that causes the selected processing unit 26 to shut down or to become unavailable. The selected processing unit 26 may for example be shut-down or become otherwise be permanently unavailable. The selected processing unit 26 may also become temporarily inactive, and be for example in an idle or power saving state, or unavailable due to running an application which inhibits execution of the interrupt based tasks.

In this latter situation, the monitoring unit 40 determines a change of mode of the selected processing unit 26 and outputs a corresponding routing change signal RCS to the input 72 of the interrupt router 45. In response to the reception of the routing change signal RCS, the interrupt router 45 routes the execution of the interrupt service routine ISR or of the interrupt handler to the preselected processing unit 22 or 24.

The interrupt router 45 is arranged to reroute the execution of the interrupt service routine ISR handled by the selected processing unit 26 to one or more preselected processing units 22 or 24 which remain active. This allows that the execution of interrupt driven tasks, e.g. all or the most critical, can continue to be performed with a preselected rerouting path if at least one of the processing units 22, 24 or 26 of the plurality is in the active mode. Thus, the safety functionality of the microprocessor is improved.

Additionally, the rerouting of the interrupt driven tasks from the selected processing unit 26 to the one or more preselected processing units 22 and/or 24 can predetermined. Thereby, risks such as e.g. loss of data, suspending an execution of tasks associated with a failure of a processing unit in the system, may be mitigated by using a suitable predetermined rerouting scheme. Furthermore, since the expected (maximum) load can be determined the processing units 22, 24 and 26 may be suitably designed to be able to handle the expected load.

The interrupt controller 10 may be implemented in any manner suitable for the specific application. For example, the initial routing of the received interrupt request IR may be performed in any manner suitable for the specific implementation, and e.g. be based on prioritizing the interrupt requests or any other suitable manner.

The interrupt requests may any type of interrupt request suitable for the specific implementation, such as hardware interrupt request, software interrupt request, inter-processor interrupt request, etc. In one example, the interrupt request IR associated with the interrupt service may be a non-maskable interrupt request. A non-maskable interrupt request is an interrupt request that should not be capable of being disabled and should always be able to be handled.

The monitoring unit 40 may be implemented in any manner suitable for the specific implementation. The monitoring unit 40 may e.g. be a watchdog timer, i.e. an electronic timer that may be used to detect and recover from a malfunctioning of processing units 22, 24 and 26. During active mode, the processing units 22, 24 and 26 may regularly reset and restart the watchdog timer to prevent it from elapsing, or "timing out". If, due to a hardware or software failure, the selected processing unit 26 fails to restart the watchdog timer, the watchdog timer will elapse and generate a timeout signal. The routing change signal RCS may be for example the timeout signal or may be derived from the timeout signal of the watchdog timer.

Also, the interrupt router 45 may be implemented in any manner suitable for the specific implementation, and the interrupt router 45 e.g. be implemented as a state-machine or other suitable, configurable or not, logic circuit which can operate without control by a software executed by the processing units. Thereby, re-routing the execution of the interrupt service routine ISR associated with the received interrupt request IR can be performed in hardware, thereby improving the speed of rerouting compared to for example a software solution.

Figure 2:
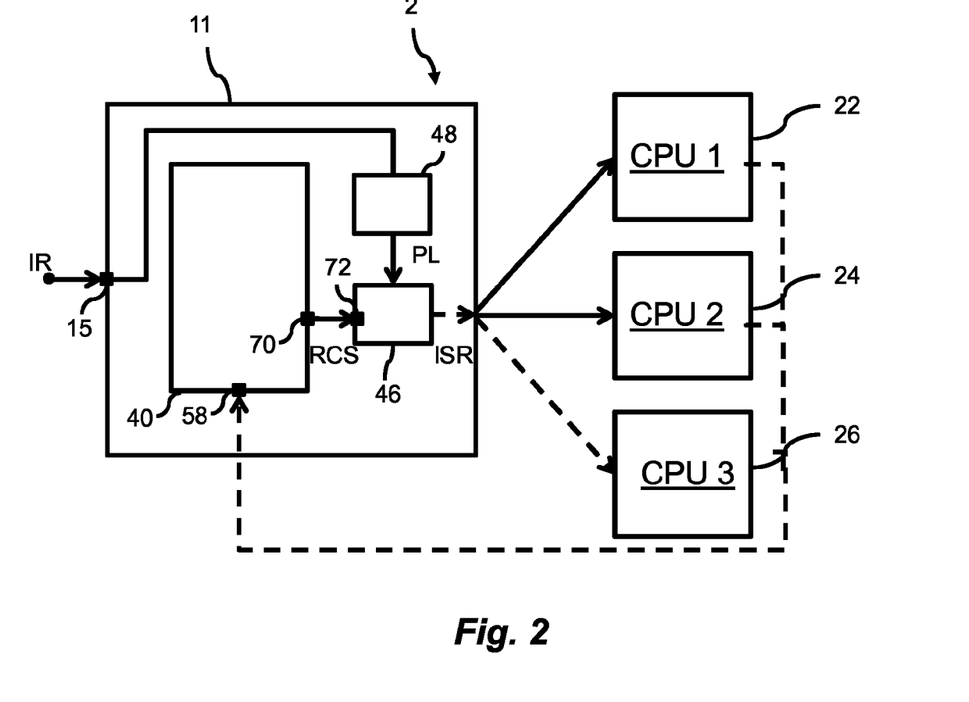
FIG. 2 schematically shows a block diagram of a second example of a microprocessor.

The interrupt router may be arranged to route the interrupts in any manner suitable for the specific use of the microprocessor 1 or 2. For example, the interrupt router may be pre-configured during manufacturing of the microprocessor, or configurable and to be configured after assembling into a system. Likewise, the routing may be static or dynamic. For example the interrupt router may be arranged to have specified rerouting options or paths during starting up of the microprocessor 1 or 2, i.e. during starting up of the processing units 22, 24 and 26 and during starting up of the interrupt controller 10 or 11. Alternatively the interrupt router may be arranged to have specified rerouting options or paths during a phase in which all the processing units 22, 24 and 26 of the multiprocessor 1 or 2 are active and not affected by any failure or change of state.

In case both the monitoring and interrupt router operate without control by software executed by the processing units, the need for processing units to monitor the status of the other CPU's before rerouting can take place is obviated. Thus, re-routing can be performed without significant time delays associated with the continuation of the execution of the interrupt service routine ISR or of any other suitable interrupt driven tasks.

FIG. 2 schematically shows a block diagram of a second example of a microprocessor 2. The microprocessor 2 comprises an interrupt controller 11. The interrupt controller 11 comprises, in addition to the interrupt router 46, a priority controller 48 assigning a priority level PL to the received interrupt request IR. The priority controller 48 may be connected with an input connectable to the input 15 of the interrupt controller 11 and with an output connectable to another input of the interrupt router 46. The interrupt router 46 may be coupled to the controller input 15 via the priority controller 48.

The interrupt router 46 may be arranged to route the execution of the interrupt service routine ISR from the selected processing unit 26 to the other preselected processing unit 22 or 24 if the monitoring unit 40 determines the selected processing unit 26 is in inactive mode while the preselected processing unit 22 or 24 is in the active mode, and if the received interrupt request IR associated with the execution of the interrupt service routine ISR has the priority level PL within a predetermined priority range. In this manner the most critical interrupt driven tasks associated with the particular processing unit 26 may be rerouted upon failure or shut-down of the selected processing unit 26.

For example, only the interrupt driven tasks associated with a received interrupt request having a priority level higher than a predetermined priority threshold may be re-routed to the other active processing units 22 or 24. In addition, the interrupt driven tasks associated with the selected processing unit 26 associated with an interrupt request having a priority level lower than the predetermined priority threshold may be suspended.

By way of an example, if the selected processing unit 26, CPU3 of FIG. 2 has an associated plurality of interrupt driven tasks with a predetermined priority level ranging from 1 to 15, the interrupt driven tasks can all be rerouted to a preselected processing units 22 and/or 24, independent from the predetermined priority level PL.

However, alternatively, only the interrupt driven tasks executed by the selected processing unit 26 and associated with a received priority request IR having a high priority level, within a first predetermined priority range, for example in the range between 11-15, are rerouted to a first preselected processing unit, for example to the processing unit 22 CPU1. Additionally, the interrupt driven tasks associated with a received interrupt request IR having a medium priority level within a second predetermined priority range, for example in the range between 6-10, may be rerouted to a another, second preselected processing unit, for example to the processing unit 24, CPU2. In such a case, interrupt driven tasks associated with a received interrupt request having a low priority level, below a predetermined priority threshold, for example below priority level 6, can be suspended and not re-routed. Thereby, an undue processing load on the preselected processing units 22 or 24 may be prevented.

The first predetermined priority range may have an upper limit and a lower limit. The upper limit may for example be the maximum priority level. The second predetermined priority range may have an upper limit at or below the upper limit of the first predetermined priority range, and at or below the lower limit of the first predetermined priority range. The predetermined priority threshold may be below the upper limit of the second predetermined priority range, and at or below the lower limit of the second predetermined priority range.

Figure 3:
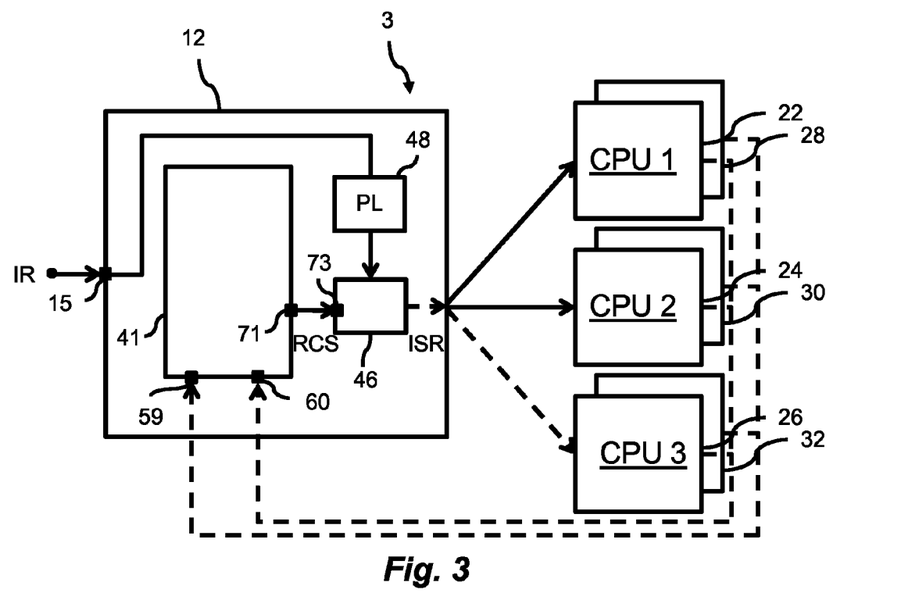
FIG. 3 schematically shows a block diagram of a third example of a microprocessor.

FIG. 3 schematically shows a block diagram of a third example of a microprocessor 3. In the microprocessor 3, the processing units form sets, such that each of the processing units 22, 24 and 26 has a second corresponding partner processing unit 28, 30, and 32. The processing units in a set are arranged, when operating in lockstep, to simultaneously execute a same sequence of operations in parallel. A processing unit 22, 24 and 26, and its partner processing unit 28, 30 and 32, may for example, in a synchronised mode, both run the same computer program A, (e.g. in lockstep, that is run the same set of operations at the same time) in parallel while running independently from each other in a not-synchronised mode. In the not-synchronised mode, the processing unit 22, 24 and 26 may run for example a computer program B whereas its respective partner processing unit 28, 30 and 32 may run for example a computer program C.

The monitoring unit of FIG. 3 may be a lockstep monitoring unit 41 arranged to monitor a difference in the execution of the same sequence of operations between each processing unit 22, 24, 26 and the respective partner processing unit 28, 30, and 32 in order to detect a processing error in the execution of the operations. The lockstep monitoring unit 41 may have two inputs 59 and 60 connectable to the plurality of processing units 22, 24 and 26 and to the plurality of corresponding partner processing units 28, 30 and 32 respectively. The lockstep monitoring output 71 may be arranged to provide the routing change signal RCS to the input 73 of the interrupt router 46 if the lockstep monitoring unit 41 detects a processing error. The processing error may be a consequence of a hardware or software failure or change of state, e.g. change from an active mode to an inactive mode or to a power saving mode or shut-down, of the processing unit 22, 24 or 26.

A time shift (not indicated in FIG. 3) may be introduced between the first mentioned processing units 22, 24 and 26 and the respective partner process units 28, 30 and 32 so that a probability of a processing error detection caused by an hardware or software failure in, e.g., the selected processing unit 26 (or in any other faulty processing unit of the multiprocessor system) is higher than without the time shift.

Figure 4:
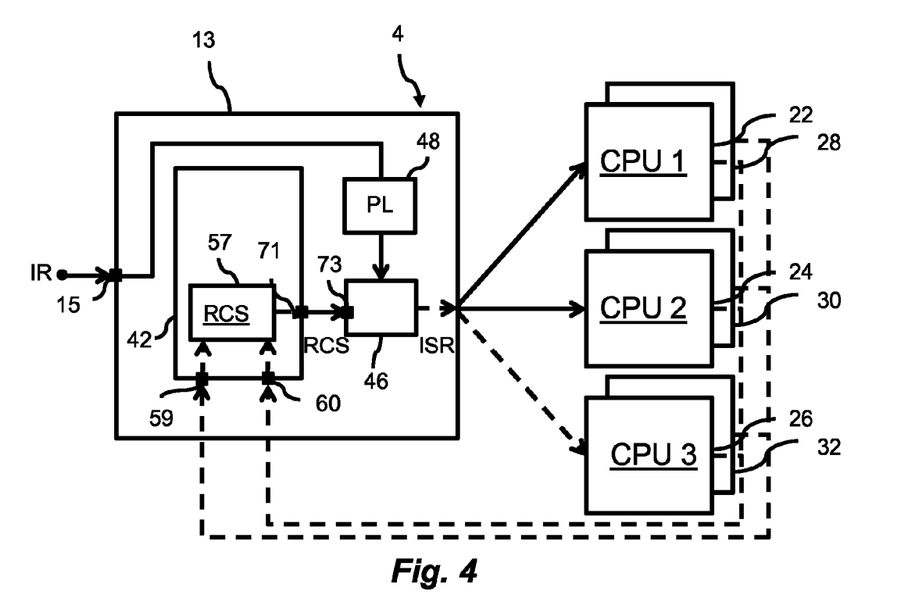
FIG. 4 schematically shows a block diagram of a fourth example of a microprocessor.

FIG. 4 schematically shows a block diagram of fourth example of a microprocessor 4, in which the monitoring unit 42 further includes a fault collection unit 57 that may receive information relative to any error due to a hardware or software failure or change of state of any of the processing unit 22, 24 or 26 through the two inputs 59 and 60 and stores it. The fault collection unit 57 may comprise a memory unit or any other type of suitable storing device for storing the received information. The fault collection unit 57 may generate the routing change signal RCS based on the received information, e.g. if the fault collection unit 57 determines that the received information indicates a failure or change of state of a processing unit of the plurality. The routing change signal RCS may correspond to any error due to a hardware or software failure or a change of the state (e.g. from active mode to inactive mode or to power saving mode or shut-down) of any of the processing unit 22, 24 or 26. It will be apparent that the fault collection unit 57 may be used in a microprocessor without processing units operating in lock-step, and hence be provided outside the monitoring unit 42. The fault collection unit 57 may periodically update a mode status of each of the plurality of processing units 22, 24 or 26 and provide the generated routing change signal RCS to the router input 73 of interrupt router 46 via the monitoring output 71 of the monitoring unit 42. In response to the RCS, the interrupt controller 13 may reroute the execution of the interrupt service request ISR from the selected processing unit 26.

The interrupt controller 10, 11, 12 or 13 may reroute the interrupt driven tasks in any suitable manner, and for example reroute the interrupt driven tasks to the active processing units 22 and/or 24 of the multiprocessor system based on the priority level of the interrupts driven tasks executed by the particular processing unit 26 when the particular processing unit 26 becomes inactive in response to a hardware failure or software failure or a change of state.

It should be noted that the change of the state may be triggered by the microprocessor, e.g. in order to save power. For example, the selected processing unit 26 may be turned to a power saving mode or shut-down to save power while the other remaining processing unit or units are in an active mode. Other change of states might include a reset state change where the processing unit 22, 24 or 26 is reset to clear a fault. The microprocessor may ensure that the execution of the interrupt service routine ISR associated with the received interrupt request IR initially routed to and performed by the selected processing unit 26 can be continued to be performed even when the selected processing unit 26 becomes unavailable, by suitable rerouting by the interrupt controller to another processing unit that remains active. After the interrupt controller 10, 11, 12, or 13 has rerouted the desired interrupt driven tasks to the active and preselected processing units 22 or 24 of the multiprocessor system, the selected processing unit 26 may be re-enabled (e.g. if the selected processing unit 26 exits a power saving mode). In this latter case the previous rerouted interrupt driven tasks associated with the received interrupt request IR may be again rerouted to the selected processing unit 26 to which the same interrupt driven tasks were originally routed.

The rerouted interrupt driven tasks may also be rerouted to other active or available processing units 22 or 24 of the multi-processor system or microprocessor 1, 2, 3 or 4 if the processing unit or processing units 22 or 24 to which the rerouted interrupt driven tasks have been re-routed, also change state or fail due to a hardware or software failure. In this latter example the handling and the routing of the associated interrupt driven tasks may be ensured also in case of a software or hardware failure or a change of state of multiple processor units in a multi-processor system.

Any of the microprocessors 1 to 4 shown through the FIGS. 1 to 4 may provide the safety features required in automotive electronic systems and automotive vehicles defined by the International Standard ISO-26262, which is the adaptation of IEC 61508 to comply with needs specific to the application sector of electrical and/or electronic (E/E) systems within road vehicles, or other functional safety related set of requirements.

Figure 6:
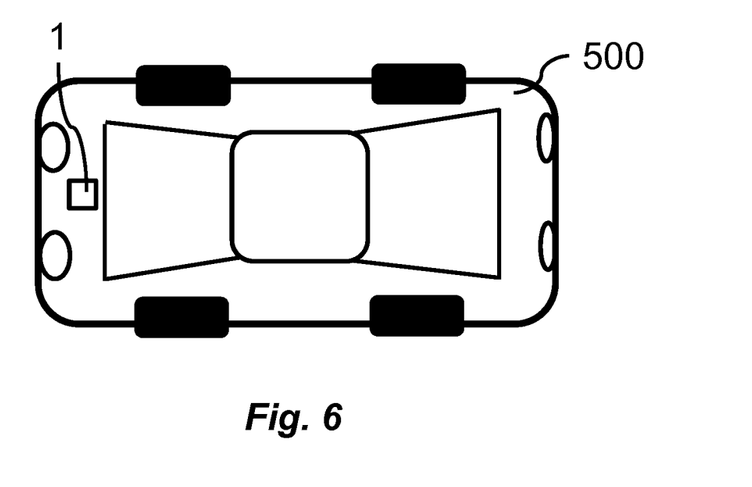
FIG. 6 shows a computer readable medium.

The microprocessor may for example be included in an apparatus, for example, in a stationary system or a vehicle, such as a car or a plane or other type of vehicle. FIG. 6 shows an example of an automotive vehicle 500, in the example a car, in which, for example, the microprocessor 1 is provided. The microprocessor 1 may comprise a plurality of processing units comprising an interrupt controller receiving interrupt requests from peripherals in the automotive vehicle 500, e.g. a memory of a device or of a control unit, a multimedia display or device, etc., routing the execution of an interrupt driven task to a selected processing unit in response to the received interrupt request and re-routing the interrupt driven task to a pre-selected active processing unit if the selected processing unit becomes inactive.

Figure 5:
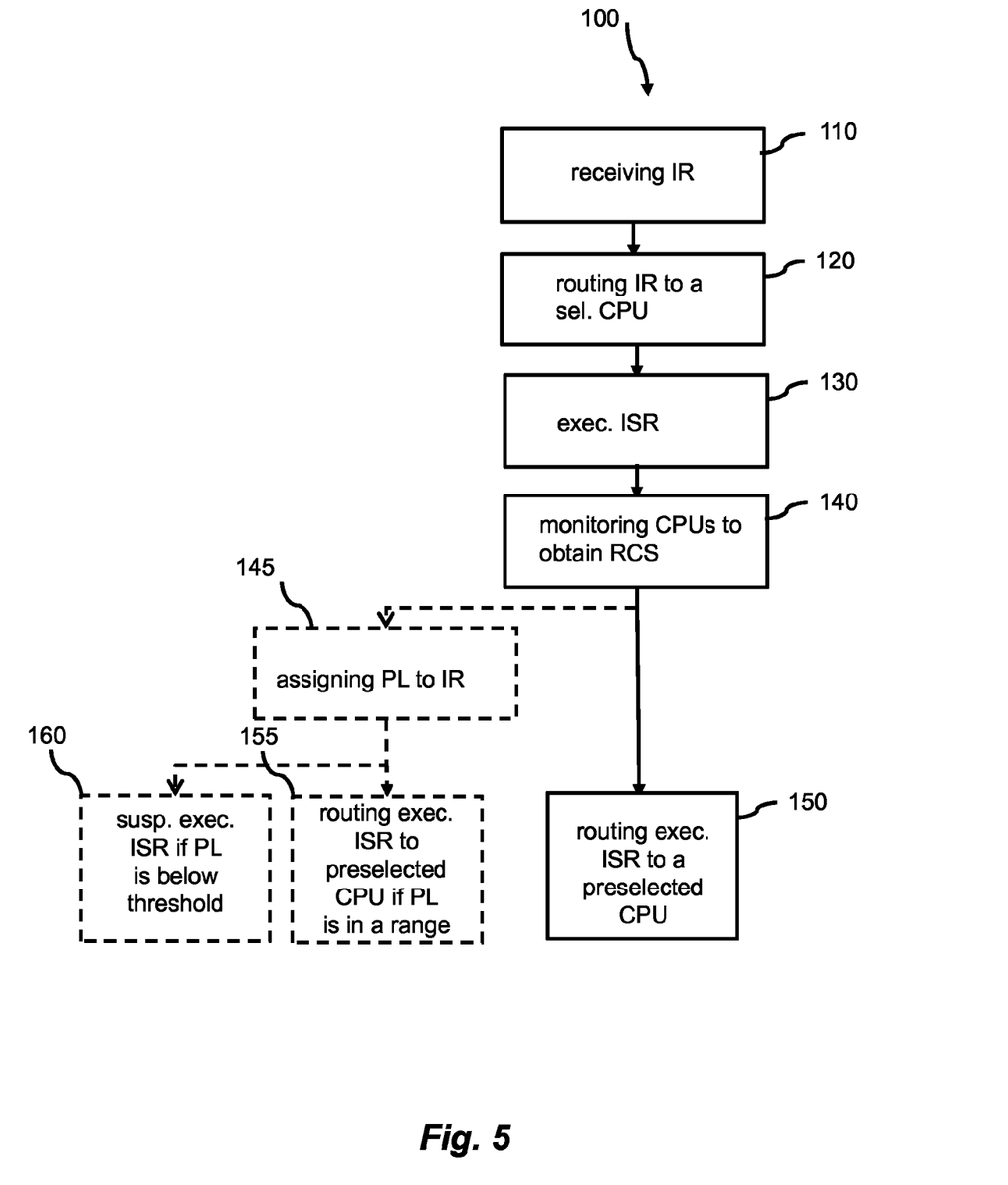
FIG. 5 schematically shows a flow diagram of a method of controlling processing of interrupt requests.

FIG. 5 schematically show a flow diagram 100 of a method of controlling processing of interrupt requests by a plurality of processing units, the processing units having at least two modes: an active and an inactive mode. The method comprises:

receiving 110 an interrupt request IR,
routing 120 the received interrupt request IR to a selected processing unit of the plurality,
executing 130 an interrupt service routine ISR comprising a sequence of operations in response to routing 120 the received interrupt request IR,
monitoring 140 the mode of the processing units to obtain a routing change signal RCS if the selected processing unit is in inactive mode while a preselected one of the plurality of processing units is in an active mode, and
routing 150 the executing 130 of the interrupt service routine ISR from the selected processing unit to the preselected processing unit in response to the obtained routing change state.

The method may be performed with a microprocessors, such as for instance in the examples of the FIGS. 1 to 4 or in any other suitable manner.

The method described through the flow diagram of FIG. 5 may be used to reroute the execution of individual or multiple interrupt service routines ISRs associated with one or multiple interrupt requests IRs initially routed to a selected processing unit. One or more processing units of the plurality of processing units may be preselected to obtain one or more preselected processing units to which the multiple interrupts driven tasks may be rerouted. All or some of the multiple interrupt service routines ISRs may be rerouted to one or more preselected processing units remaining active.

The method may be used to route the execution of one or more interrupt service routines ISRs to the one or more preselected processing units if the one or more associated interrupt requests IRs have a priority level PL within one or more predetermined priority ranges. For example interrupts driven tasks with associated interrupt requests having a priority level PL within a first predetermined priority range may be routed to a first active preselected processing unit, interrupt driven tasks with interrupt requests having a priority level PL within a second predetermined priority range may be routed to a second active pre-selected processing unit, etc.

The method may be additionally or optionally be used to suspend the interrupt driven tasks associated to interrupt requests having a priority level below a predetermined priority threshold.

As previously discussed a selected processing unit may become inactive because of a hardware or software failure or because of a change of its state. In all cases the selected processing unit may shut-down or be not available to handle the initially associated interrupt request IR associated with the execution of the interrupt service routine ISR.

The routing 150 is performed only by hardware without software code intervention. Since there is no software code intervention in the routing 150, the routing 150 can be executed faster than in the case when software code intervention is used. The method may ensure that there is a minimum delay in routing and in continuing the processing of the interrupt driven tasks associated with the received interrupt requests IRs when the selected processing unit becomes inactive and cannot process the interrupt driven tasks initially routed to it anymore.

In the foregoing specification, the invention has been described with reference to specific examples of embodiments of the invention. It will, however be evident that various modifications and changes may be made without departing from the broader scope of the invention as set forth in the appended claims, and that the claims are not intended to be limited to the specific examples shown. For example, in FIGS. 1 to 4, for illustrative purpose, only three processing units 22, 24 and 26 or only three processing units 22, 24 and 26 in combination with the respective partner processing units 28, 30 and 32 are shown. However the microprocessor may include more than three processing units and more than three respective partner processing units.

The processing units 22, 24 and 26, the partner processing units 28, 30 and 32 and the interrupt controller 10, 11, 12 and 13 may for example include a microcontroller. The processing units 22, 24 and 26, the partner processing units 28, 30 and 32 and the interrupt controller 10, 11, 12 and 13 may for example include one or more of: DSP controller, a sequencer, a computer, a distributed computer system, another interrupt controller. Also, the processing units 22, 24 and 26, the partner processing units 28, 30 and 32 and the interrupt controller 10, 11, 12 and 13 may form part of a System on a chip (SoC).

The processing units 22, 24 and 26, the partner processing units 28, 30 and 32 and the interrupt controller 10, 11, 12 and 13 shown through the FIGS. 1 to 4 as separate devices may be integrated in a single physical device. Also, the units shown may be suitably combined in one or more semiconductor devices.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An interrupt controller for controlling processing of interrupt requests by a plurality of processing units, the processing units having at least two modes, said mode comprising an active mode and an inactive mode, the interrupt controller comprising:
   a controller input for receiving an interrupt request;
   an interrupt router coupled to the controller input arranged to route a received interrupt request, to a selected processing unit out of the plurality of processing units, in response to which the selected processing unit initiates execution of an interrupt service routine, comprising a sequence of operations, the interrupt router comprising a router input for receiving a routing change signal, the interrupt router arranged to route the execution of the interrupt service routine from the selected processing unit to another preselected processing unit of the plurality of processing units in response to receiving the routing change signal;
   a monitoring unit comprising a monitoring input coupled to the plurality of the processing units to monitor the mode of the processing units, and a monitoring output coupled to the router input arranged to provide the routing change signal when the monitoring unit determines that the selected processing unit has changed to said inactive mode subsequent to initiation of execution of the interrupt service routine while the preselected one of the plurality of the processing units is in said active mode, and the interrupt request associated with the interrupt service routine has a priority level above a predetermined priority threshold.

2. An interrupt controller as claimed in claim 1 comprising a priority controller arranged to assign the priority level to the received interrupt request.

3. An interrupt controller as claimed in claim 1, wherein the interrupt router is further arranged to suspend the execution of the interrupt service routine if the associated interrupt request has a priority level lower than a predetermined priority threshold when the selected processing unit goes into inactive mode.

4. An interrupt controller as claimed in claim 1, wherein the interrupt router is further arranged to route all the interrupt requests from the selected one of the processing units to the preselected one.

5. An interrupt controller as claimed in claim 1, wherein the interrupt router is further arranged to preselect a specific processing unit of the plurality when the selected processing unit is in the active mode or upon one or more of the group comprising: start-up, interrupt controller reset, and processing unit reset, and to reroute to the preselected processing unit in response to receiving the routing change signal.

6. An interrupt controller as claimed in claim 1, wherein the monitoring unit outputs the routing change signal in response to a software failure or to a hardware failure in the selected processing unit, or when the selected processing unit out of the plurality of processing units has changed of state.

7. An interrupt controller according to claim 1, wherein each one of plurality of the processing units is further arranged, when operating in lockstep, to simultaneously execute a same sequence of operations in parallel with a second corresponding partner processing unit, wherein the monitoring unit is a lockstep monitoring unit for monitoring a difference in the executing of the same sequence of operations between each processing unit and the respective partner processing unit to detect a processing error, and wherein the monitoring output is arranged to provide the routing change signal if the lockstep monitoring unit detects the processing error.

8. An interrupt controller according to claim 1, wherein the interrupt request is a non-maskable interrupt request.

9. An interrupt controller according to claim 1, wherein the monitoring unit is further arranged to monitor one or more of a hardware failure, a software failure, or change of mode of the plurality of processing units in response to which the monitoring unit is arranged to output the routing change signal via the monitoring output.

10. An interrupt controller as claimed in claim 9 wherein the monitoring unit is a watchdog timer.

11. An interrupt controller as claimed in claim 1 wherein the monitoring unit further comprises a fault collection unit arranged to store the routing change signal.

12. A microprocessor comprising the interrupt controller according to claim 1, and the plurality processing units.

13. A microprocessor comprising the interrupt controller according to claim 1, and further comprising the plurality of processing units and the corresponding partner processing unit, arranged to operate in lockstep with the plurality of processing units.

14. An automotive vehicle comprising the interrupt controller as claimed in claim 1.

15. A method of controlling processing of interrupt requests by a plurality of processing units, the processing units having at least two modes, said modes comprising an active and an inactive mode, the method comprising:
receiving an interrupt request,
routing the received interrupt request to a selected processing unit of the plurality,
initiating execution of an interrupt service routine comprising a sequence of operations at the selected processor in response to routing the received interrupt request,
monitoring the mode of the processing units to obtain a routing change signal from the selected processor when the selected processing unit has changed to said inactive mode subsequent to initiating execution of the interrupt service routing,
routing the executing of the interrupt service routine from the selected processing unit to another processing unit that is in said active mode in response to the obtained routing change state when the executing interrupt service routing has a priority level above a predetermined priority threshold.

16. The method of claim 15 further comprising before routing:
assigning the priority level to the received interrupt request.

17. The method of claim 16 further comprising after assigning:
suspending the execution of the interrupt service routine if the associated interrupt request has a priority level below a predetermined priority threshold.

18. A device comprising: a plurality of processing units including a first processing unit and a second processing unit, each of the plurality of processors having a plurality of modes including a first mode, and an inactive mode;
a monitoring unit coupled to the plurality or processors to provide a change indicator that indicates the first processing unit has changed state from the first mode to the inactive mode;
an interrupt router coupled to the output of the monitoring unit and to the plurality of processors, the interrupt router to initiate execution of an interrupt service routing by the first processor in response to receiving an interrupt request and in response to the first processor being in the first mode, and, when the interrupt request has a priority level above a predetermined priority level, the interrupt router further arranged to route the execution of the interrupt service routine from the first processing unit to the second processing unit in response to receiving the change indicator after execution of the interrupt service routine has been initiated at the first processing unit.

* * * * *